United States Patent

[11] 3,597,577

[72] Inventors Jean Claude Eugene Guittet
Veurey-Voroize;
Jean Claude Richard, Sassenage, both of, France
[21] Appl. No. 757,360
[22] Filed Sept. 4, 1968
[45] Patented Aug. 3, 1971
[73] Assignee Societe dit: Societe Industrielle De Combustible Nucleaire
Annecy, France
[32] Priority Sept. 7, 1967
[33] France
[31] 120,341

[54] X-RAY EXAMINATION OF WELDS
6 Claims, 2 Drawing Figs.
[52] U.S. Cl. .................................................EB, 219/121
250/49.5
[51] Int. Cl. ................................................. B23k 15/00
[50] Field of Search........................................ 219/121,
121 EB, 69; 250/49.5, 41.9, 49.58, 65

[56] References Cited
UNITED STATES PATENTS
2,987,610 6/1961 Steigerwald.................. 219/117
3,308,264 3/1967 Ullery........................... 219/121
2,418,029 3/1947 Hillier .......................... 250/49.5
3,087,058 4/1963 Arvanetakis et al. ......... 250/52
3,221,133 11/1965 Kazato et al. ................. 219/69

OTHER REFERENCES
B. D. Cullity Elements of X-Ray Diffraction, 1956, pages 16— 19.

*Primary Examiner*—J. V. Truhe
*Assistant Examiner*—R. E. O'Neill
*Attorney*—Littlepage, Quaintance, Wray and Aisenberg ABSTRACT: The welding seam between two metal parts which are being or have been electron beam welded in a vacuum enclosure are examined by means of X-rays generated within said enclosure by electron bombardment of an anticathode or target located inside said enclosure. The electron beam used for bombarding the target may be generated by the same gun as that used for the welding, deflection means being provided for deflecting said beam from the welding site to the X-ray target and vice versa. Alternately, at least two separate electron guns may be provided, one being used to generate the electron beam for bombarding the X-ray target, and the other or others for the welding.

X-RAY EXAMINATION OF WELDS

The invention relates to a method for in situ radiographic examination of weld seams of parts welded by electronic bombardment and to a device for carrying out said method.

It is common, at present, to carry out a radioscopic or radiographic examination of a metal assembly previously subject to a metallurgical treatment, such as for example, a welding operation. If the examination shows up a defect, the assembly must be subjected again to the metallurgical treatment; such a repetition may be particularly delicate if a welding operation is to be performed again over a previous weld especially when the welding operation is carried out by means of an electron beam, which requires placing the parts to be welded in a high vacuum enclosure in a precise position. It has therefore been found desirable to provide means for carrying such a quality control "in situ" before the working position of the part has been upset.

One object of the invention is therefore, to provide a method and device for carrying the radiographic examination of metal parts during a welding operation by electronic bombardment within the vacuum enclosure itself.

Another object of the invention is to provide a method and means for carrying out examinations during welding so as to be able to immediately modify the welding parameters in order to correct defects which may have been detected.

Still another object of the invention is to provide the possibility to control the soundness of the welded parts, i.e. to note the presence for example, of cracks crevices, blisters which may eventually form, and also to detect the structural features of welded materials, for example, the nature of inclusions, segregations, phase modifications or the like.

The method of examining the properties of an assembly welded by electronic bombardment in a vacuum enclosure consists according to the invention, in directing on an area of the seam which is to be inspected while the welded parts are inside said vacuum enclosure an X-ray beam generated within said vacuum enclosure through electronic bombardment of an anticathode arranged inside said enclosure and receiving on an X-ray sensitive surface the image produced by said X-ray beam after having passed through said area of the joint.

The anticathode or target may be bombarded intermittently or continuously, either by the welding beam or by an auxiliary electron beam.

The X-ray of said target may be formed of relatively heavy metal, for example, having an atomic number higher than 40, such as molybdenum, tungsten or silver; the area of transparency to the continuous X-ray spectrum is then examined; the target may also be made of a relatively light material, such as for example copper, chromium, iron, manganese or the like and the area is then examined by noting the transparency to the characteristic lines of the spectrum (glow spectrum) of the considered material under consideration. In the case of a copper target, where the excitation threshold for the K$\alpha$ line is of the order of 9 kv., it is known that bombardment of the copper target by electrons subjected to a 40 kv. voltage gives a line of wavelength 1.54 A. which is of definitely higher intensity than the continuous spectrum; a much finer radioscopic study may thus be carried out as compared with that of a pattern obtained with a continuous spectrum, by considering the absorption discontinuities of the materials comprising the composition of the welded alloy. It must be noted however that the use of specific luminescence lines leads to relatively rapid damage of targets whose melting temperatures are low. In order to make this damage practically insignificant, it is advantageous to impart to the target a continuous rotational or translational movement. The target used for carrying out the method is then chosen as a function of the nature of the material to be examined and of the examination operation desired. Thus, radiography of steel part of small thicknesses (below 5 mm.) is carried out with a tungsten target under high voltages of the order of 40 kv. to 50 kv. The control of the metallurgical structure of the same parts is performed using an iron target at 40 kv.; the improvement in contrast is such that phase iron crystalline $\alpha$ and $\gamma$ phases may be distinguished from each other.

The examination according to the invention may be carried out using X-ray photography when the part is welded and maintained in place in the vacuum enclosure. The examination may also be carried out, with certain advantages, by radioscopy on the part in the enclosure during welding, thus making it possible, if need be, to modify the settings of the electron gun during operation; this radioscopic examination also makes it possible at the beginning of a second welding, to adapt the previous welding parameters to this new operation without having to sacrifice a first part as sample. The invention, therefore, leads to great advantages in welding by means of electronic bombardment from the point of view of precision obtained, as well as working and manufacturing speed, and substantial savings due to the elimination of the need to dispose of certain parts as waste.

A device for carrying out the method according to the invention may comprise, within the vacuum enclosure of an electron-beam welding apparatus an anticathode arranged in said enclosure, an electron gun adapted to direct an electron beam to an impact point in said anticathode, a window transparent to X-rays provided in the wall of said enclosure in the direction of a straight line passing through said impact point and a point at which the welded seam may be brought, and X-ray sensitive means arranged outside of said window.

One and a same electron gun may, where the geometry of the weld permits it, be used as an electron source for bombarding both the welding spot and the X-ray target. A deflection device of any known type may be provided to obtain relative displacement of the welding beam with respect to the welded part and target. Also, any appropriate device may be used to displace the gun and therefore the beam it generates.

At least two electron guns may also be provided one of which is then used to produce the X-rays, the other or others being used for welding; this arrangement is particularly advantageous when the weld to be carried out does not admit of an axis of symmetry.

The results obtained using the method according to the invention may be examined through a window of the vacuum enclosure through direct vision or through the use of a chamber provided with a television camera the patterns being projected onto a screen or recorded on a film for subsequent examination. Provision of an independent electron gun for obtaining the X-ray beam has the advantage of facilitating the control and especially of making it possible to easily adapt, and if need be, in a continuous manner, the quality and intensity of said X-rays to the nature of the desired examination and to the characteristics of the treated parts without modifying the operational parameters of the gun employed for welding.

Other objects and advantages of the invention will appear from the following description of two embodiments of said invention.

In the drawings

Figure 1:
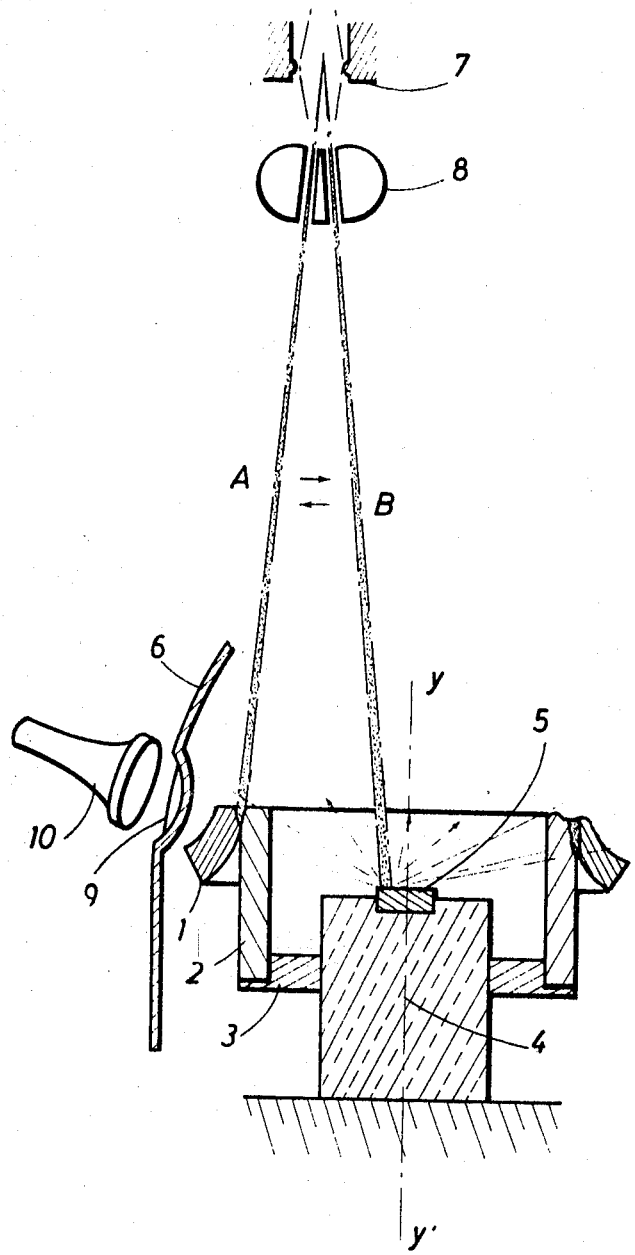
FIG. 1 is a diagrammatic representation of a device comprising a single electron gun for carrying out the invention.

In the example shown in FIG. 1, part 1 is to be welded onto a part 2 which admits an axis of symmetry $yy'$, and is mounted on a support 3–4 having the same axis $yy'$. Driving means of any known type, not shown, provide for rotation of support 3, 4 and as a result, of part 2 around axis $yy'$. An anticathode or X-ray target 5 is located at the center of the upper horizontal surface or rotational shaft 4 of support 3. Part of the wall 6 of a vacuum enclosure is shown, said vacuum enclosure being part of an electron-beam welding apparatus which comprises, in addition, an electron gun 7 and a known device 8 for the deflection of the electron beam emitted by gun 7. Shell 6, in addition, is provided with at least one port hole 9 transparent to X-rays and behind which is located an X-ray recording system 10, e.g. a chamber provided with a television camera or a radiographic emulsion. Deflecting device 8 is set so as to direct the beam from gum along path A on the welding site or along path B on target 5. The point of impact of the beam on said target may be offset in order to eliminate crater formation hazards. Observation or photography of the radiographic patterns takes place through port hole 9 and recording system 10. In general, welding of parts 1 and 2 is first carried out (position A of the electron beam) followed by examination (position B of the beam) so as to prevent interference from X-rays emitted by the part during welding with the X-rays originating from target 5.

With the device according to FIG. 1, a 10 kv. electron gun has for example been used, of the type known as sold by AL-CATEL, Paris-France, said gun being mounted in a type 1500 furnace of the same firm. Part 2, on which is to be welded part 1, is a ring made of 34 NCD 16 steel, 50 mm., in diameter and 2 mm. thick. To perform the weld, part 2 is rotated around axis $yy'$ at a linear speed of 5.5 cm./sec.; the deflecting device 8 is set so that the welding beam constantly holds position A, the acceleration voltage being 30 kv. at an intensity of 10.5 ma. A tungsten target is placed on shaft 4, giving a continuous spectrum within a band from 0.65 A. to 1 A. When the beam is deviated into position B the observation is carried out by X-ray.

It should be noted, that for new or particularly delicate welding operation, it is advantageous to carry out a continuous examination. To this end, at the moment of bombardment of the target by the electron beam, i.e. when said beam occupies position B, the part that has just been welded is observed either through port hole 9 (acting as a diaphragm) using a radiosensitive television chamber forming a pattern on a screen, or by forming the pattern, on a film, in reel form, the unwinding of which is controlled simultaneously with the movement of support 3-4. Crater formation hazards in target 5 are prevented by offsetting the impact point of the electron beam on said target which is rotated with the support. The target disposition may be modified according to requirements. To examine the structure of a given alloy, it is advantageous to assemble on a single support a plurality of targets chosen according to absorption discontinuities existing in the alloy. Bringing successively each target under the control electron beam shows up the structure of the metal. Thus for example, when controlling an alloy containing chromium, nickel and molybdenum, a first analysis requires for target a tungsten pellet, after which an iron pellet will cause chromium rich zones to appear, then a zinc pellet will make it possible to characterize nickel rich zones and finally, a silver pellet will cause molybdenum zones to appear, the electron beam being deflected from one target to another by means of deflecting means 8. It is self-evident that crater formation hazards are high, more particularly for the zinc pellet which can be advantageously rotated. It can be seen therefore that targets may reach a certain degree of complexity. When the welding operation involves a set of mass-produced parts, a very simple radiographic examination of each assembly may be carried out after welding thereof is completed, and will generally be sufficient. Recording of the radiographic pattern may then be readily carried out on a film placed in the enclosure in the vicinity of the part to be controlled. In such a case, the beam is deflected to position B and is maintained in said position only for the period of time necessary to obtain a pattern of sufficient density on the photographic film, the length of said period varying according to the thickness of the welded parts and the nature of the metal. In the above described example, using a tungsten target, a good X-ray photograph is obtained at 50 kv. and 15 ma. in less than 1 second.

In the above example, the operations follow one another in time on what may be termed respectively the examination area and the welding area.

Figure 2:
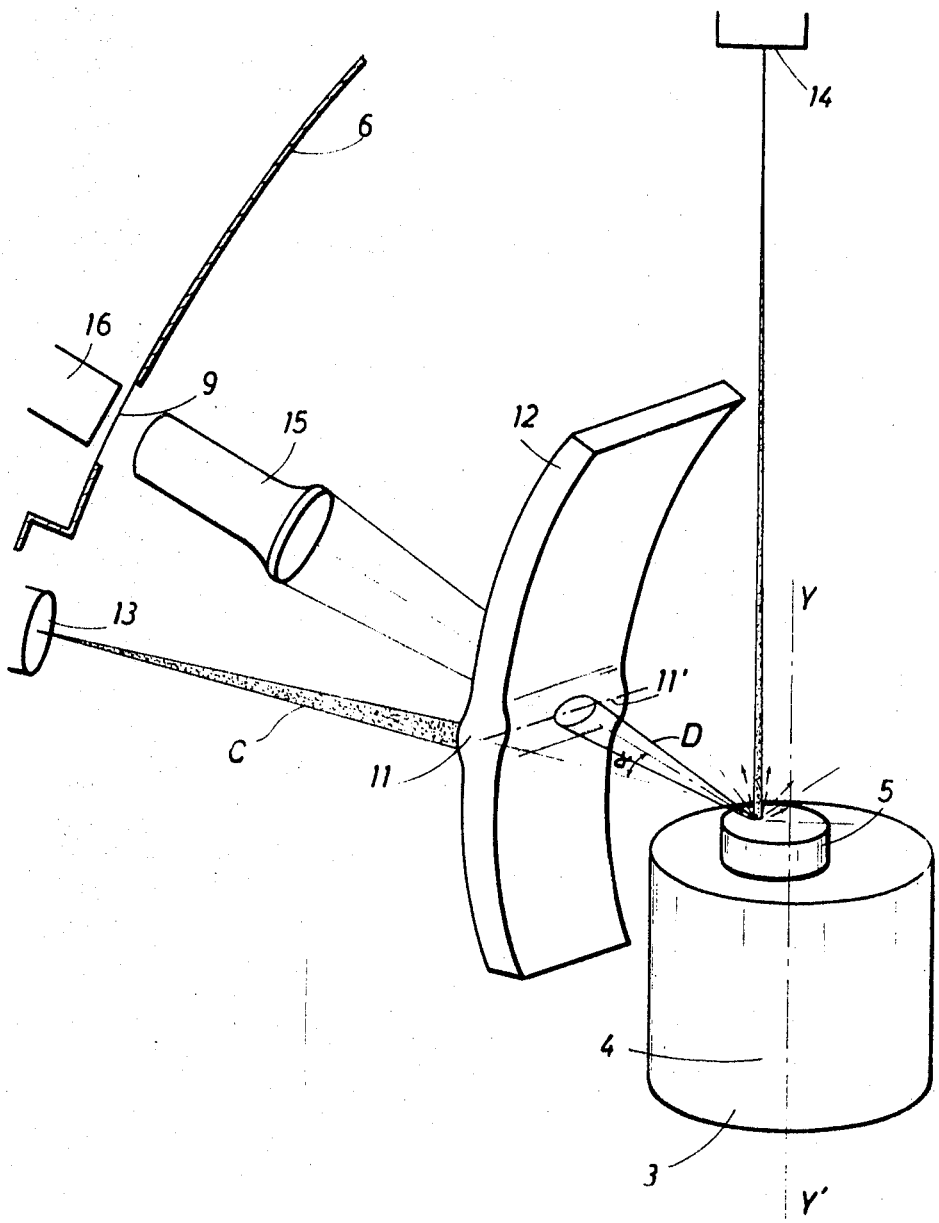
FIG. 2 is a similar view of a device comprising two electron guns each of which has a specific function according to the invention.

In the second embodiment shown in FIG. 2 the arrangement is such that the examination area follows the welding area in space and not in time, which is particularly well suited in the case of welding one part to another along a welding line having no axis of symmetry. As in the above example, the apparatus comprising vacuum enclosure 6 with its port hole 9, transparent to X-rays a support 4 rotated by any appropriate means (not shown) around its axis $yy'$ and a target 5. Weld II is to be performed along line 11' on part 12. A first electron gun 13 issues a welding beam C and a second electron gun 14 issues another beam directed to target 5, said beam being offset with respect to said target which in turn will emit X-ray beam D. Appropriate supporting and driving members for part 12 are provided but not shown.

In the present embodiment, it is therefore possible not only to carry out the examination more simply than in the first example during the welding operation itself but, furthermore, to immediately adjust, irrespective of the conditions required for the welding operation, the grade of the X-ray radiation and its intensity according to the type of examination desired and the nature and size, particularly thickness, of the parts which have been or are in the process of being welded; finally in this arrangement the adjustment welding gun does not need to be periodically modified for adaptation to X-ray generation.

In a practical working example, using the arrangement of FIG. 2, a magnesium part 25 mm. thick was welded, by imparting to it a linear speed of 6 mm./sec. Gun 13 operated at a 10 kv. voltage; gun 14, or examination gun, was used for time periods of less than 1 second at a 35 kv., voltage for bombarding target 5 consisting of a tungsten block placed on shaft axis 4 in the welding enclosure, said shaft being rotated to prevent crater formation hazards.

When the operation involves welding on steel parts the characteristics of which are not precisely known, it is necessary to follow the welding operation from beginning to end so as to continuously correct, the welding parameters. In such a case, a highly stopped down detector 15 is placed within the vacuum enclosure so as to eliminate diffuse radiation originating from impact of the welding beam, on the welding area. When part 12 being welded is displaced in front of welding gun 13, the radiographic pattern resulting from beam D is transmitted through port hole 9 of enclosure 6 either to a chamber comprising a radiosensitive television camera 16, the observer following the operations on a screen near the welding device control panel, or onto a conventional radiographic emulsion.

A device may also be used in which the part is stationary and the welding electron gun is movable, the detector and chamber comprising the television camera or the film then being incorporated into a vacuum resistant block. This block moves simultaneously with the welding electron gun to which it is mechanically linked; the observation is carried out under the same conditions as before on a stationary screen located near the control panel. It is of course possible to photograph the observation screen whenever this appears to be necessary.

We claim:

1. The method for welding and X-ray detecting properties of welds between metal parts in a vacuum enclosure comprising: positioning metal parts in an enclosure, maintaining a vacuum within the enclosure, directing an electron beam on the parts, thereby welding the parts, redirecting the electron beam toward a target anticathode positioned inside the vacuum enclosure, thereby generating an X-ray beam by electronically bombarding the anticathode, directing the X-ray beam on a weld between the metal parts, and receiving an X-ray beam passing through the weld on an X-ray sensitive surface.

2. The method for welding and X-ray detecting properties of welds between metal parts in a vacuum enclosure comprising: positioning metal parts in an enclosure, maintaining a vacuum environment within the enclosure, generating first and second electron beams in the enclosure, directing the first electron beam on the parts, thereby welding the parts, directing the second electron beam through the environment of the vacuum enclosure to an anticathode positioned inside the vacuum enclosure, and spaced from a generator of the second electron beam, thereby electronically bombarding the anticathode and generating an X-ray beam, directing the X-ray beam on a weld between the metal parts, and receiving an X-ray beam passing through the weld on an X-ray sensitive surface.

3. Welding and X-ray apparatus for welding and detecting properties of welds between metal parts comprising a vacuum enclosure enclosing the metal parts, an anticathode positioned in the enclosure, an electron beam generating means positioned in the enclosure for generating an electron beam, an electron beam switching means positioned in the enclosure for directing the electron beam generated in the enclosure toward the metal parts to be welded and alternately directing the electron beam to an impact point on the anticathode for electronically bombarding the anticathode and thereby generating an X-ray beam and for directing the X-ray beam toward the metal parts, and an X-ray sensitive means positioned on a side of the metal parts opposite the anticathode for receiving an X-ray beam passing through a weld area on the metal parts.

4. The apparatus according to claim 3 wherein the anticathode is made of a metal having an atomic number greater than 40.

5. The apparatus according to claim 3 wherein the anticathode is made of a light metal selected from the group of light metals consisting of copper, chrome, manganese and iron.

6. Welding and X-ray apparatus for detecting properties of electronic welds between metal parts in a vacuum enclosure comprising a vacuum enclosure enclosing the metal parts and creating a vacuum environment, an anticathode positioned in the enclosure adjacent the metal parts, first electron gun means positioned in the enclosure for directing a welding electron beam in the enclosure toward the metal parts to be welded, second electron gun means positioned in the enclosure remote from the anticathode and remote from the metal parts for directing an electron beam through the environment of the vacuum enclosure to an impact point on the anticathode for electronically bombarding the anticathode and thereby generating an X-ray beam and for directing the X-ray beam toward the metal parts, and an X-ray sensitive means positioned on a side of the metal parts opposite the anticathode for receiving an X-ray beam passing through a joint area of the metal parts.